United States Patent
Bettagere et al.

(10) Patent No.: US 9,605,562 B2
(45) Date of Patent: Mar. 28, 2017

(54) TURBOMACHINE ACCESSORY GEARBOX ALIGNMENT PIN

(71) Applicant: United Technologies Corporation, Hartford, CT (US)

(72) Inventors: Lakshminarayan S. Bettagere, Farmington, CT (US); Keven Van Duyn, Bloomfield, CT (US); Mark R. Sondeen, West Hartford, CT (US); Jonathan F. Zimmitti, Newington, CT (US)

(73) Assignee: United Techologies Corporation, Hartford, CT (US)

( * ) Notice: Subject to any disclaimer, the term of this patent is extended or adjusted under 35 U.S.C. 154(b) by 68 days.

(21) Appl. No.: 14/617,178

(22) Filed: Feb. 9, 2015

(65) Prior Publication Data

US 2016/0230601 A1    Aug. 11, 2016

(51) Int. Cl.
*F01D 25/28* (2006.01)
*F02C 7/32* (2006.01)
*F02M 26/67* (2016.01)

(52) U.S. Cl.
CPC ............... *F01D 25/28* (2013.01); *F02C 7/32* (2013.01); *F02M 26/67* (2016.02); *F05D 2230/642* (2013.01); *F05D 2250/241* (2013.01); *F05D 2260/30* (2013.01); *F05D 2260/37* (2013.01); *Y02T 50/675* (2013.01)

(58) Field of Classification Search
CPC .......... F01D 15/02; F01D 25/16; F01D 25/28; F01D 25/125; F05D 2220/30; F05D 2230/60; F05D 2230/64; F05D 2240/50; F05D 2240/52; F05D 2240/53; F05D 2240/54; F05D 2230/642; F05D 2250/241; F05D 2260/30; F05D 2260/37; F16H 2057/02039; F16H 2057/0216; F02C 7/32; F02C 7/06; F02C 7/268; F04D 13/026; F04D 13/0633; F04D 19/048; F04D 29/056; F04D 29/0563; F04D 29/059; F04D 29/58; F02M 26/67; Y02T 50/675

See application file for complete search history.

(56) References Cited

U.S. PATENT DOCUMENTS

| | | | |
|---|---|---|---|
| 5,271,285 A * | 12/1993 | Silliman, Jr. | F02N 7/08 123/179.31 |
| 5,277,382 A * | 1/1994 | Seelen | B64D 27/26 244/54 |
| 5,435,124 A | 7/1995 | Sadil et al. | |
| 6,170,252 B1 | 1/2001 | Van Duyn | |
| 6,357,220 B1 | 3/2002 | Snyder et al. | |
| 7,093,996 B2 * | 8/2006 | Wallace | B64D 27/26 403/78 |

(Continued)

FOREIGN PATENT DOCUMENTS

| | | |
|---|---|---|
| CN | 103233216 | 8/2013 |
| WO | 2014137575 | 9/2014 |

*Primary Examiner* — Adam D Rogers
(74) *Attorney, Agent, or Firm* — Carlson, Gaskey & Olds, P.C.

(57) ABSTRACT

An exemplary gearbox assembly includes a shear bracket connectable to a flange of a housing structure, and a support pin extending along a longitudinal axis, the support pin supporting the shear bracket relative to a turbomachine, the shear bracket moveable axially relative to the support pin.

17 Claims, 11 Drawing Sheets

(56) References Cited

U.S. PATENT DOCUMENTS

| | | | |
|---|---|---|---|
| 8,123,159 B2* | 2/2012 | Hollimon | B64D 33/04 |
| | | | 239/265.23 |
| 8,561,501 B2 | 10/2013 | Niggemeier et al. | |
| 9,016,068 B2* | 4/2015 | Martin | F02C 7/20 |
| | | | 244/58 |
| 9,046,041 B2* | 6/2015 | Rejman | F02C 7/32 |
| 9,062,603 B2* | 6/2015 | LeBlanc | F02C 7/00 |
| 9,086,014 B2* | 7/2015 | Ahmed | B65D 25/22 |
| 2011/0296847 A1 | 12/2011 | Williams | |
| 2012/0317991 A1 | 12/2012 | Frost et al. | |
| 2013/0042630 A1* | 2/2013 | Muldoon | F02C 7/32 |
| | | | 60/796 |
| 2016/0017811 A1* | 1/2016 | Martin | F02C 7/36 |
| | | | 60/805 |
| 2016/0230600 A1* | 8/2016 | Bettagere | F01D 25/28 |

* cited by examiner

TURBOMACHINE ACCESSORY GEARBOX ALIGNMENT PIN

TECHNICAL FIELD

This disclosure relates generally to an accessory gearbox and, more particularly, to mounting an accessory gearbox to a turbomachine.

BACKGROUND

Turbomachines, such as gas turbine engines, typically include a compression section, a combustion section, and a turbine section. Turbomachines often include an accessory gearbox that is utilized to rotatably drive various accessories. The accessory gearbox may incorporate a starter for the turbomachine.

Many accessory gearboxes mount directly to a case of the turbomachine. A tower shaft rotatably couples the accessory gearbox to the turbomachine. Mounting the accessory gearbox may be difficult due to, among other things, vibrations of the accessory gearbox.

Some land-based turbomachines use accessory gearboxes that are heavier than the accessory gearboxes used for turbomachines that propel aircraft. The heavier accessory gearboxes can further complicate mounting.

SUMMARY

A gearbox assembly according to an exemplary aspect of the present disclosure includes, among other things, a shear bracket connectable to a flange of a housing structure, and a support pin extending along a longitudinal axis. The support pin supports the shear bracket relative to a turbomachine. The support pin is moveable axially relative to the shear bracket.

In a further non-limiting embodiment of the foregoing assembly, the assembly includes a hanger attachable to the turbomachine to support the support pin.

In a further non-limiting embodiment of any of the foregoing assemblies, the flange is a first flange adjacent to a starter.

In a further non-limiting embodiment of any of the foregoing assemblies, the assembly includes a second flange extending from a shaft housing portion of the housing structure. The support pin supports the second flange.

In a further non-limiting embodiment of any of the foregoing assemblies, the support pin is received within an aperture of the first flange and an aperture of the second flange.

In a further non-limiting embodiment of any of the foregoing assemblies, the assembly includes a plurality of mechanical fasteners that secure the shear bracket to the housing structure.

In a further non-limiting embodiment of any of the foregoing assemblies, the assembly includes a spherical bearing that receives the support pin. The spherical bearing is held within an aperture of the shear bracket.

In a further non-limiting embodiment of any of the foregoing assemblies, the assembly includes a bushing held by the spherical bearing, the bushing interfaces directly with the support pin and is rotatable about the longitudinal axis relative to the support pin.

In a further non-limiting embodiment of any of the foregoing assemblies, the assembly includes a gear train housed within the housing structure and a hydraulic starter secured to the housing structure.

A turbomachine assembly according to an exemplary aspect of the present disclosure includes, among other things, a turbomachine engine, a housing structure, a geartrain within a gearbox housing portion of the housing structure that is selectively driven by the turbomachine, a starter within a starter portion of the housing structure that selectively drives the turbomachine, a shear bracket connectable to a flange of the housing structure, and a support pin extending along a longitudinal axis. The support pin supports the shear bracket relative to the turbomachine engine. The support pin and the shear bracket are moveable axially relative to each other.

In a further non-limiting embodiment of the foregoing assembly, the assembly includes a hanger attached to the turbomachine engine and supporting the support pin.

In a further non-limiting embodiment of any of the foregoing assemblies, the flange is a first flange and is adjacent the starter, and further comprising at least one second flange extending from a shaft housing portion of the housing structure. The support pin supports the at least one second flange.

In a further non-limiting embodiment of any of the foregoing assemblies, the support pin is received within an aperture of the first flange and an aperture of the at least one second flange.

In a further non-limiting embodiment of any of the foregoing assemblies, the assembly includes a spherical bearing and a bushing, the spherical bearing held within an aperture of the shear bracket, the bushing held by the spherical bearing. The bushing interfaces directly with the support pin and is rotatable about the longitudinal axis relative to the support pin.

In a further non-limiting embodiment of any of the foregoing assemblies, the turbomachine is a land-based turbomachine.

A method of supporting a housing structure according to an exemplary aspect of the present disclosure includes, among other things, securing a shear bracket to a portion of a housing structure, and supporting the shear bracket relative to a turbomachine through a support pin that is moveable axially relative to the shear bracket.

In a further non-limiting embodiment of the foregoing method, the portion of the housing structure is a first portion adjacent a starter, and further includes supporting a second portion of the housing structure through the support pin. The second portion is adjacent a shaft housing portion of the gearbox.

In a further non-limiting embodiment of any of the foregoing methods, the method includes holding the support with a hanger attached to the turbomachine.

In a further non-limiting embodiment of any of the foregoing methods, the turbomachine is a land-based turbomachine.

The embodiments, examples and alternatives of the preceding paragraphs, the claims, or the following figures and description, including any of their various aspects or respective individual features, may be taken independently or in any combination. Features described in connection with one embodiment are applicable to all embodiments, unless such features are incompatible.

BRIEF DESCRIPTION OF THE DRAWINGS

The various features and advantages of the disclosed examples will become apparent to those skilled in the art from the detailed description. The figures that accompany the detailed description can be briefly described as follows.

DETAILED DESCRIPTION

Figure 1:
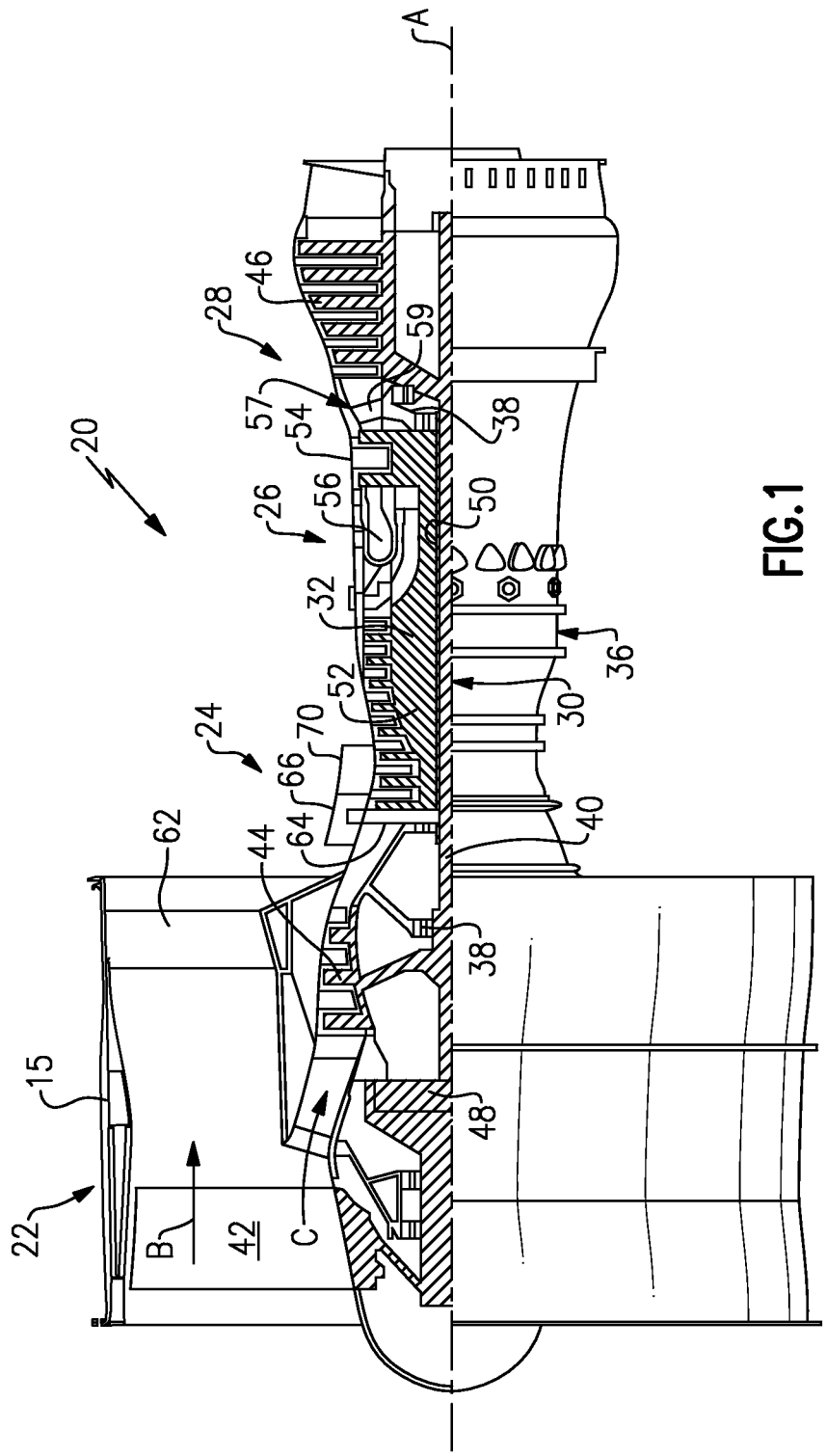
FIG. 1 shows a section view of an example turbomachine.

FIG. 1 schematically illustrates a gas turbine engine 20, which is an example type of turbomachine. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high-pressure compressor 52 and the high-pressure turbine 54. A mid-turbine frame 57 of the engine static structure 36 is arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low-pressure turbine 46 has a pressure ratio that is greater than about five. In one disclosed embodiment, the engine 20 bypass ratio is greater than about ten (10:1), the fan diameter is significantly larger than that of the low-pressure compressor 44, and the low-pressure turbine 46 has a pressure ratio that is greater than about five 5:1. Low-pressure turbine 46 pressure ratio is pressure measured prior to inlet of low-pressure turbine 46 as related to the pressure at the outlet of the low-pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\,^\circ\text{R})/(518.7^\circ\text{R})]^{0.5}$. The "Low corrected fan tip speed" as disclosed herein according to one non-limiting embodiment is less than about 1150 feet/second (350.5 meters/second).

Not all power generated by gas turbine engines is used by the engine for propulsion or for engine accessories. Typically, some of the power generated by gas turbine engines is siphoned off and used to power non-engine accessory systems of an associated aircraft. Example non-engine accessory systems include environmental control systems and electrical systems of the aircraft.

Power from gas turbine engines that is used for the non-engine accessory systems is often referred to as "off-take power." The off-take power is in addition to the power generated by the engine that provides propulsive thrust. The off-take power is also in addition to the power required to drive engine oil pumps, engine generators, or other engine operating systems.

The engine 20 includes a tower shaft 64 selectively driven by the outer shaft 50 of the high speed spool 32. The tower shaft 64 provides a rotating input to an accessory gearbox 66 that in turn drives an accessory generator 70 to provide off-take power from the engine 20. The off-take power from the accessory generator 70 may be used to power aircraft systems, such as the environmental control systems and electrical systems of the gas turbine engine 20.

The gearbox 66 is mounted to a case of the high-pressure compressor 52 in this example.

Figure 2:
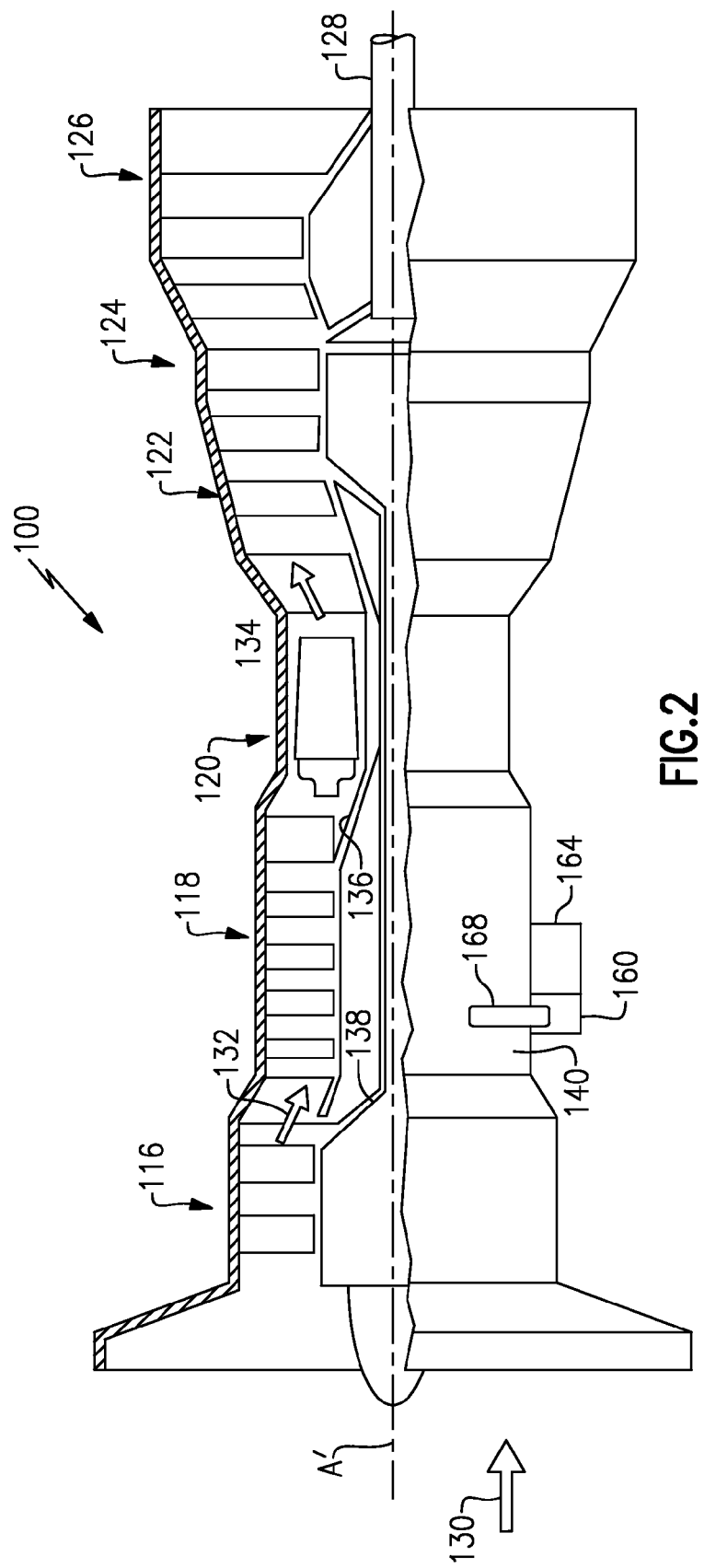
FIG. 2 shows a section view of another example turbomachine.
Figure 3:
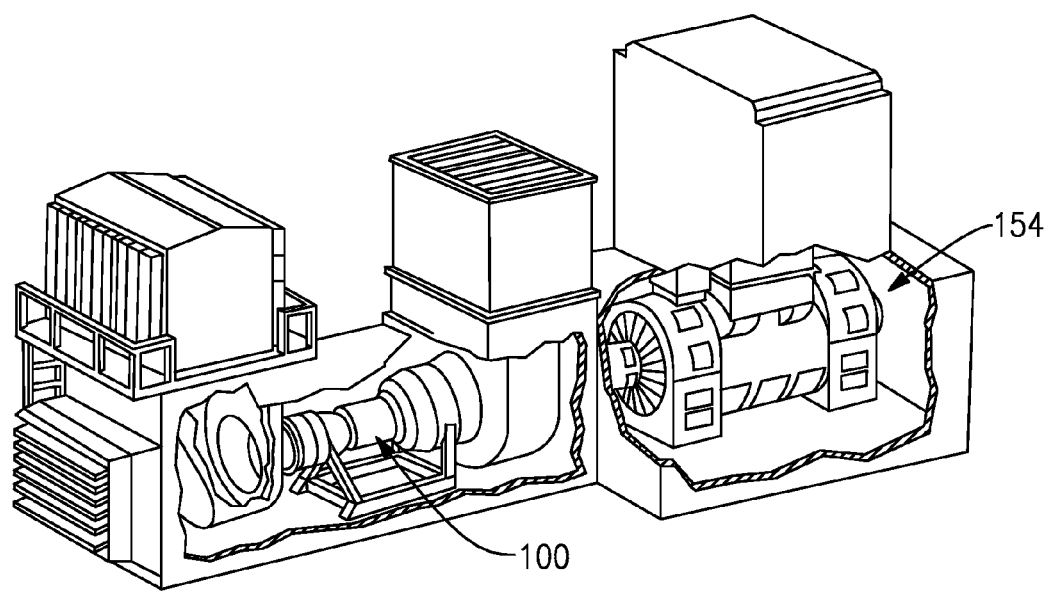
FIG. 3 shows the gas turbine engine of FIG. 2 with a generator.

Referring now to FIGS. 2 and 3 with continuing reference to FIG. 1, a gas turbine engine 100 is an industrial gas turbine engine circumferentially disposed about a central, longitudinal engine axis A'. In this disclosure, radial or radial direction is relative to the engine axis unless specified otherwise.

Gas turbine engine 100 includes, in series order from an axial front to an axial rear, a low-pressure compressor section 116, a high-pressure compressor section 118, a combustor section 120, a high-pressure turbine section 122, and a low-pressure turbine section 124. In the illustrated embodiment, a power turbine section 126 is a free turbine section disposed aft of the low-pressure turbine 124. The power turbine section 126 drives a power turbine drive shaft 128.

Ambient air 130 entering the gas turbine engine 100 becomes pressurized air 132 in the low-pressure compressor 116 and the high-pressure compressor 118. Fuel mixes with pressurized air 132 in the combustor section 120 prior to ignition and combustion of the fuel. Once the fuel has combusted, combustion gases 134 expand through the high-pressure turbine section 122, the low-pressure turbine section 124, and through the power turbine section 126. The high and low-pressure turbine sections 122 and 124 drive high and low-pressure rotor shafts 136 and 138, respectively, which rotate in response to the combustion products and thus rotate the attached high and low-pressure compressor sections 118 and 116. The power turbine section 126 may, for example, drive an electrical generator 154, pump, or gearbox through the power turbine drive shaft 128.

A high-pressure compressor exhaust case 140 is positioned between the low-pressure compressor 116 and the combustor 120. The case 140 generally defines an outer boundary of a flow path through the high-pressure compressor. The case 140 also provides structural support for the gas turbine engine 100.

An accessory gearbox 160 is mounted to the case 140. The accessory gearbox 160 incorporates a starter 164. A tower shaft 168 extends from the shaft 138 to rotatably interface with the accessory gearbox 160. The starter 164 rotates the rotor shafts 136 and 138 through the tower shaft 168 when starting the gas turbine engine 100. The starter 164 is a hydraulic starter in this example. The starter 164 can be used to mechanically windmill the gas turbine engine 100 during a cool-down procedure, for example.

When the gas turbine engine 100 reaches speed, such as a self-sustaining rotational speed, the tower shaft 168 is rotated by the gas turbine engine 100 to provide a rotational input to the accessory gearbox 160. The accessory gearbox 160 then powers accessories of the gas turbine engine 100, such as hydraulic pumps, lubricant pumps, vane actuators, etc.

Notably, in this example, the accessory gearbox 160 associated with the land-based gas turbine engine 100 is bulkier and heavier than the accessory gearbox 160 associated with the propulsion engine 20.

Figure 4:
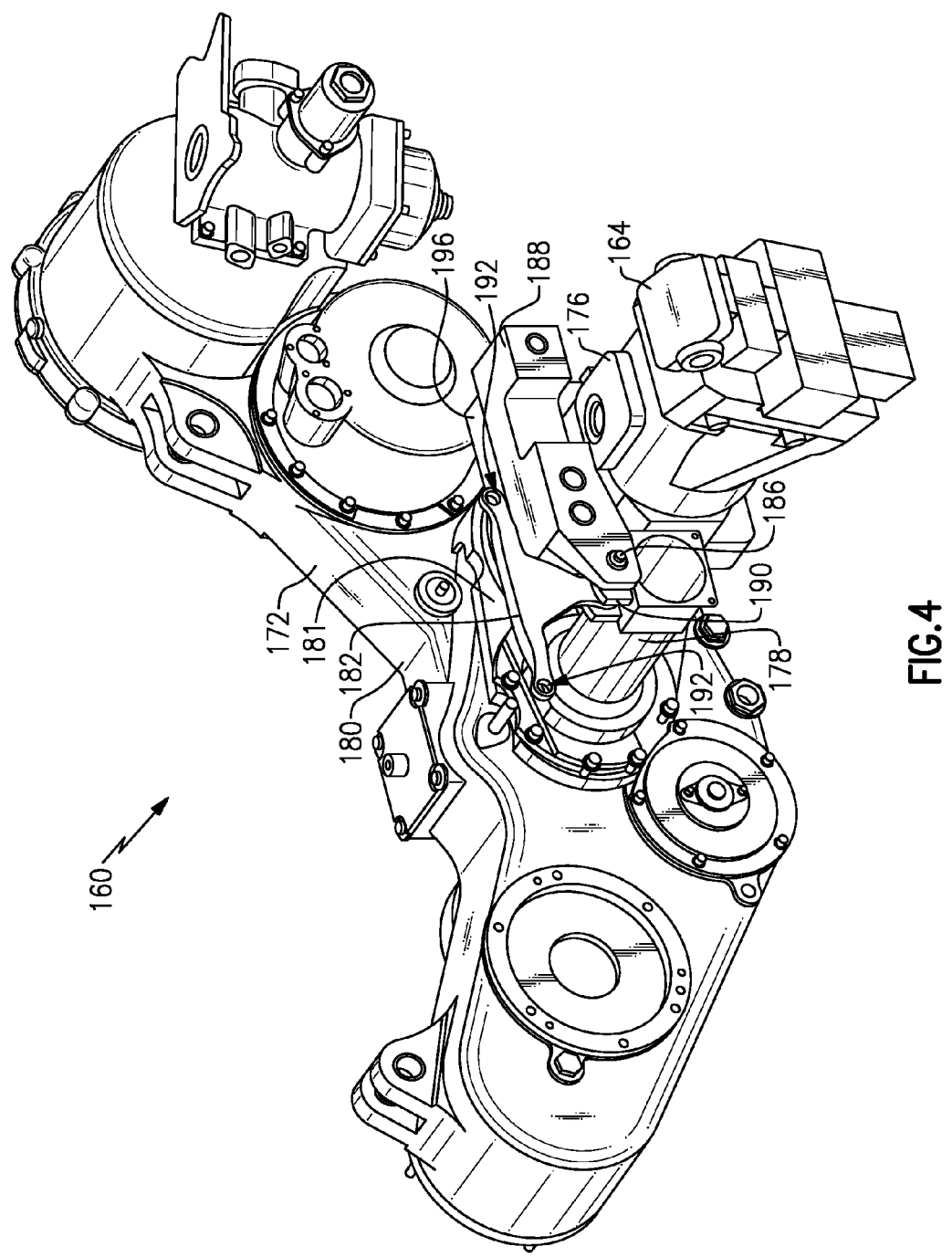
FIG. 4 shows a perspective view of an accessory gearbox for use with the turbomachine of FIGS. 2 and 3.
Figure 5:
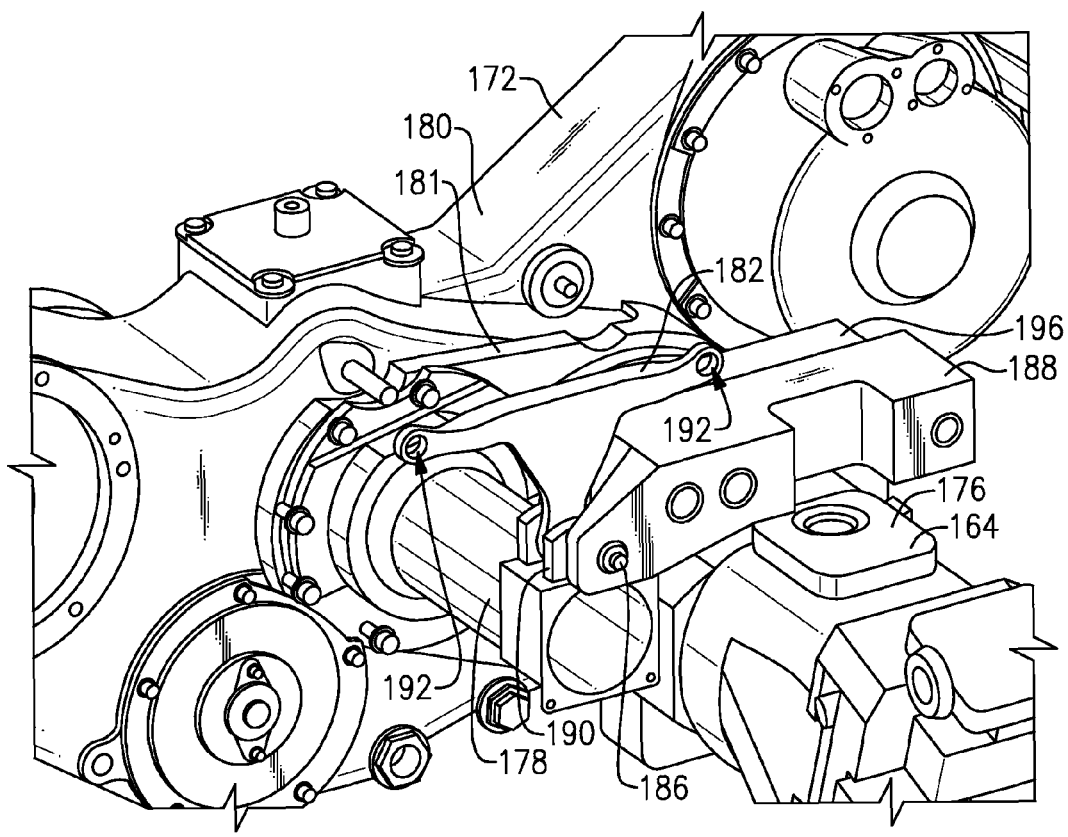
FIG. 5 shows a close-up perspective view of a portion of the accessory gearbox of FIG. 4.
Figure 6:
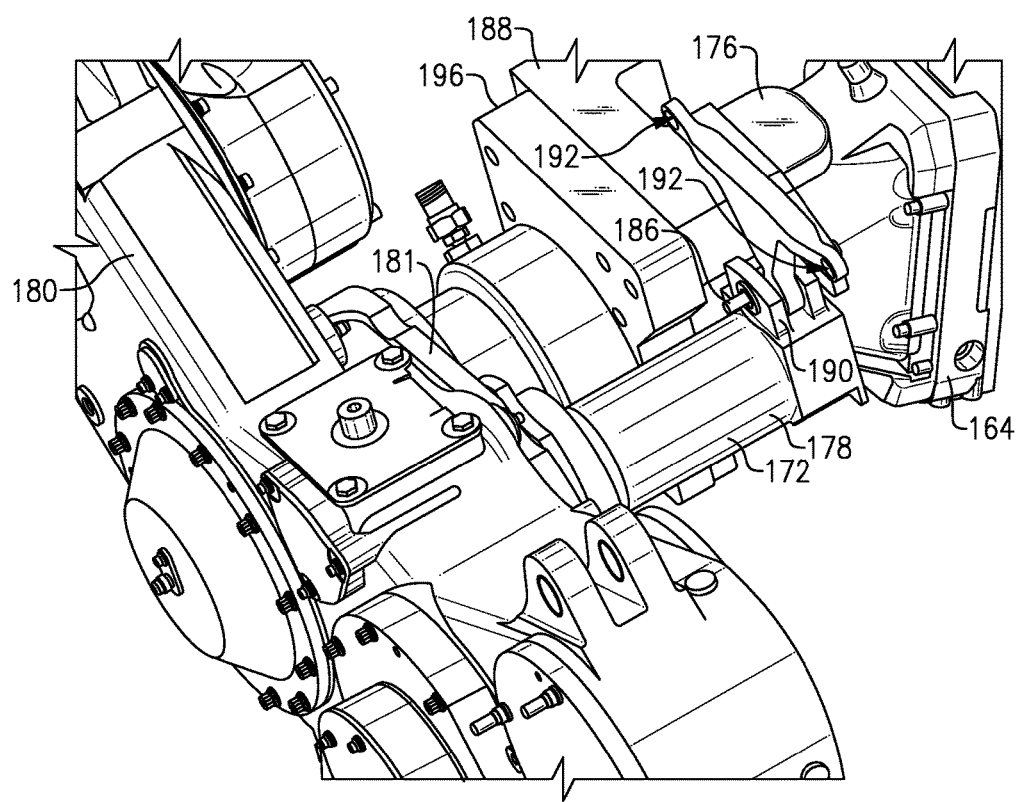
FIG. 6 shows a close-up perspective view of another portion of the accessory gearbox of FIG. 4.

Referring now to FIGS. 4 to 6 with continuing reference to FIGS. 2 and 3, the example accessory gearbox 160 includes a housing structure 172. The starter 164 and gears of the accessory gearbox 160 are housed within the housing structure 172.

The housing structure 172 includes a starter housing portion 176, a shaft housing portion 178, and a gearbox housing portion 180. The starter 164, which is a hydraulic starter in this example, is housed within the starter housing portion 176. A gear train is held within the gearbox housing portion 180. A shaft, not shown, is held within the shaft housing portion 178. The shaft may provide a rotatable input to the accessory gearbox 160, or may be rotated by the accessory gearbox 160 to power the generator 154, for example.

The example starter housing portion 176 and the shaft housing portion 178 interface with the gearbox housing portion 180 through a plate 181.

The accessory gearbox 160 is at least partially supported relative to the case 140 through a hanger 182, a support pin 186, and a shear bracket 188. A center of gravity for the starter housing portion 176 and the remaining portions of the starter is axially aligned approximately with the hanger 182. Flanges may extend from other areas of the housing structure 172 to connect to the case 140 and provide support in other areas removed from the hanger 182.

During operation, the starter housing portion 176 can move relative to the shaft housing portion 178. Relative movement may be due to thermal growth, vibration, etc. The support pin 186 couples to the shear bracket 188 in a manner that maintains a coupled relationship while permitting some relative movement between the shaft housing portion 178 and the starter housing portion 176. In particular, the coupling of the support pin 186 to the shear bracket 188 permits relative movement of the support pin 186 along a support pin axis relative to the shear bracket 188.

The support pin 186 couples together the at least one flange 190 of the shaft housing portion 178, the hanger 182, and the shear bracket 188. Bolts (not shown) extend through apertures 192 in the hanger 182 to secure the hanger 182 to the case 140. The hanger 182 holds the support pin 186 to hold the at least one flange 190 and the shear bracket 188 relative to the case 140.

The shear bracket 188 is bolted directly to a flange 196 extending from the starter housing portion 176 of the housing structure 172.

The starter 164 is thus supported relative to the case 140 through the flange 196, the shear bracket 188, the support pin 186, and the hanger 182.

Figure 7:
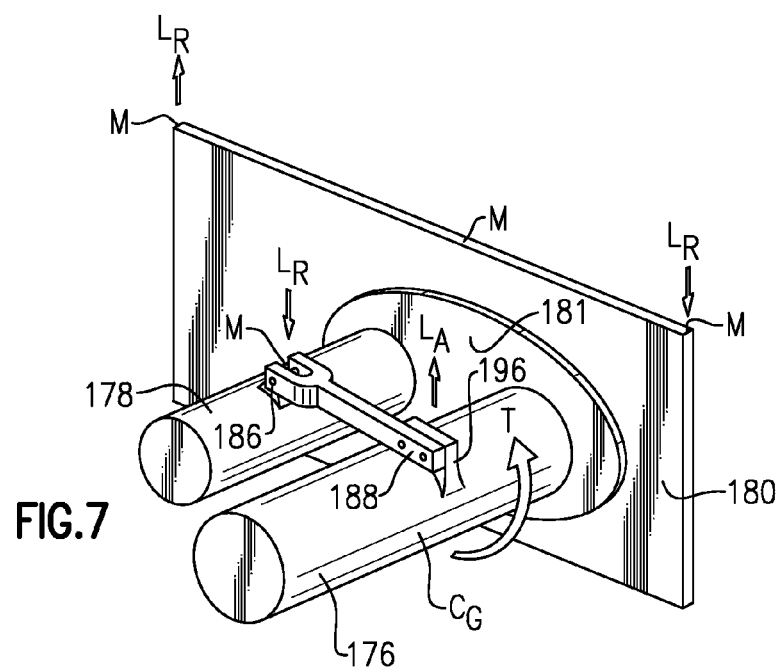
FIG. 7 is a highly schematic view of selected portions of the accessory gearbox of FIG. 4.
Figure 8:
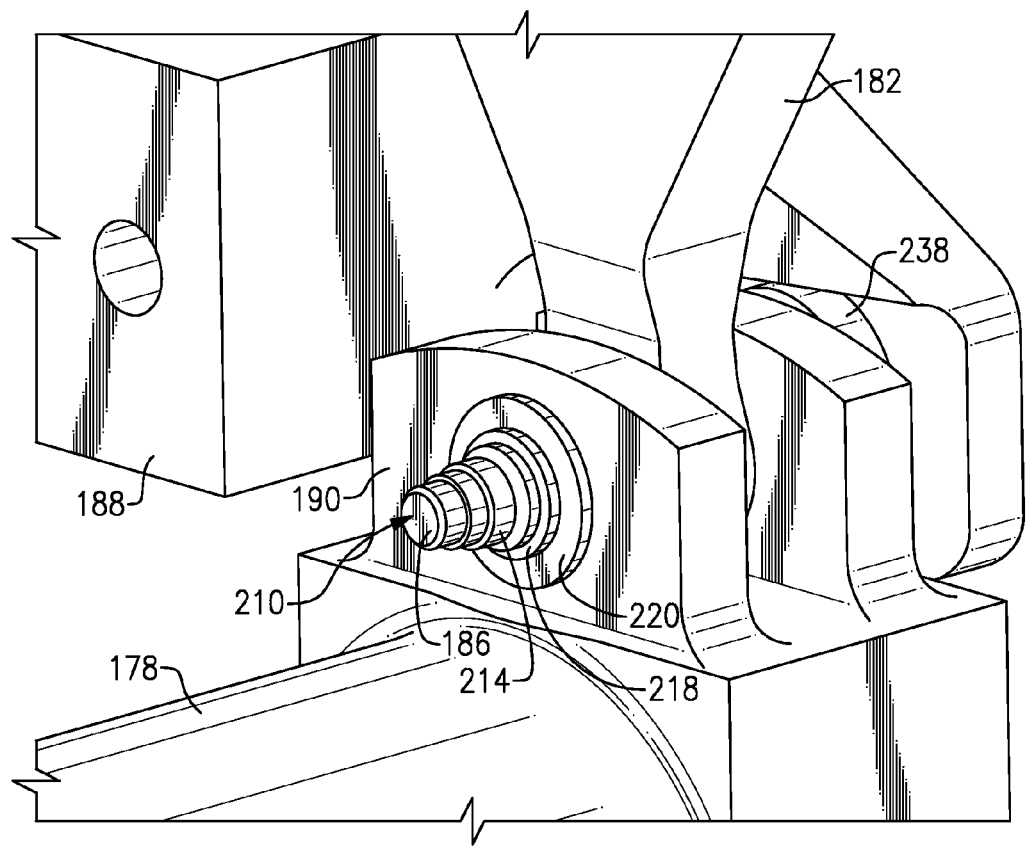
FIG. 8 shows a close-up perspective view of a support pin that supports the accessory gearbox of FIG. 4.
Figure 9:
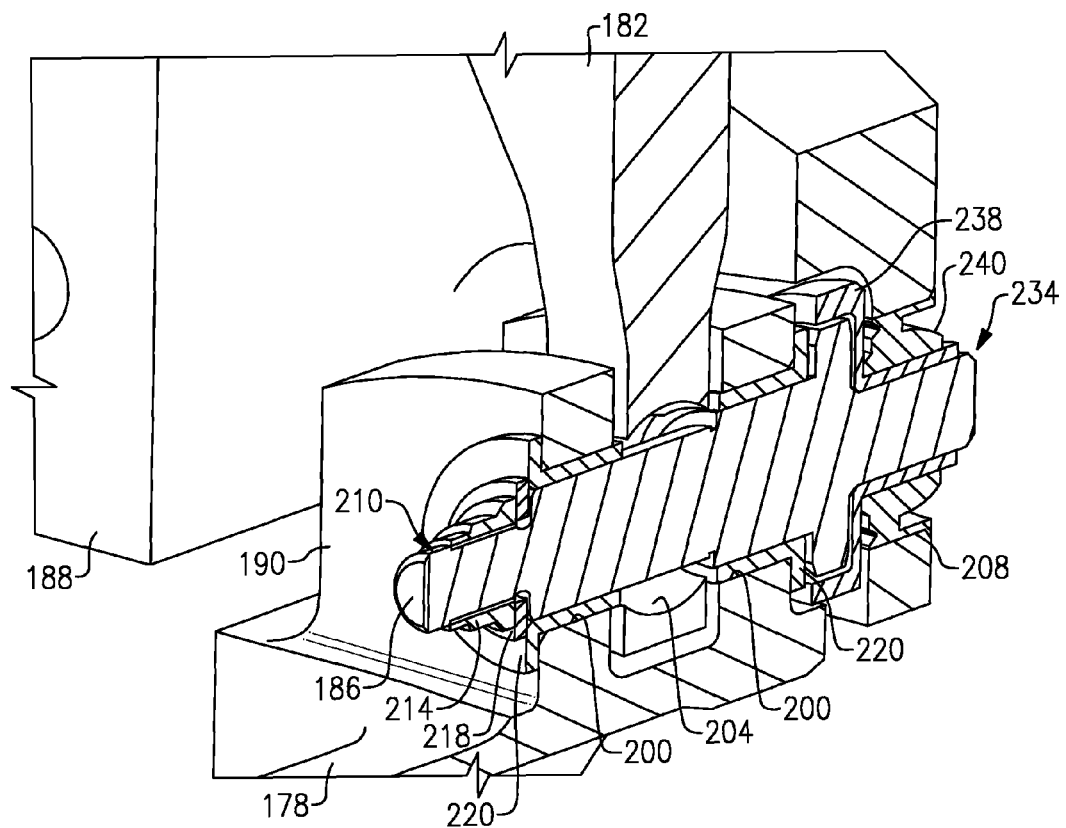
FIG. 9 shows a section view through the support pin of FIG. 8.
Figure 10:
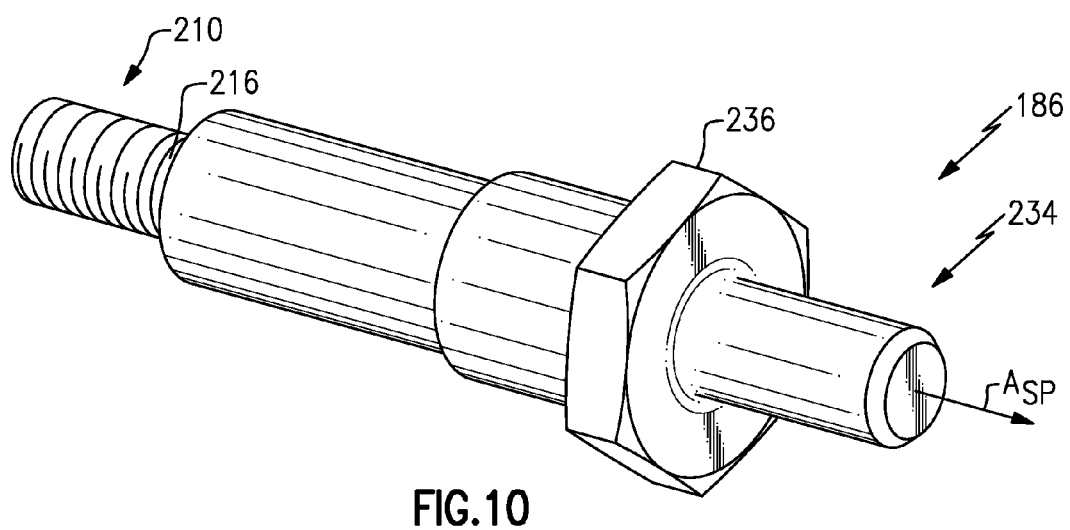
FIG. 10 shows a perspective view of the pin of FIG. 8.
Figure 11:
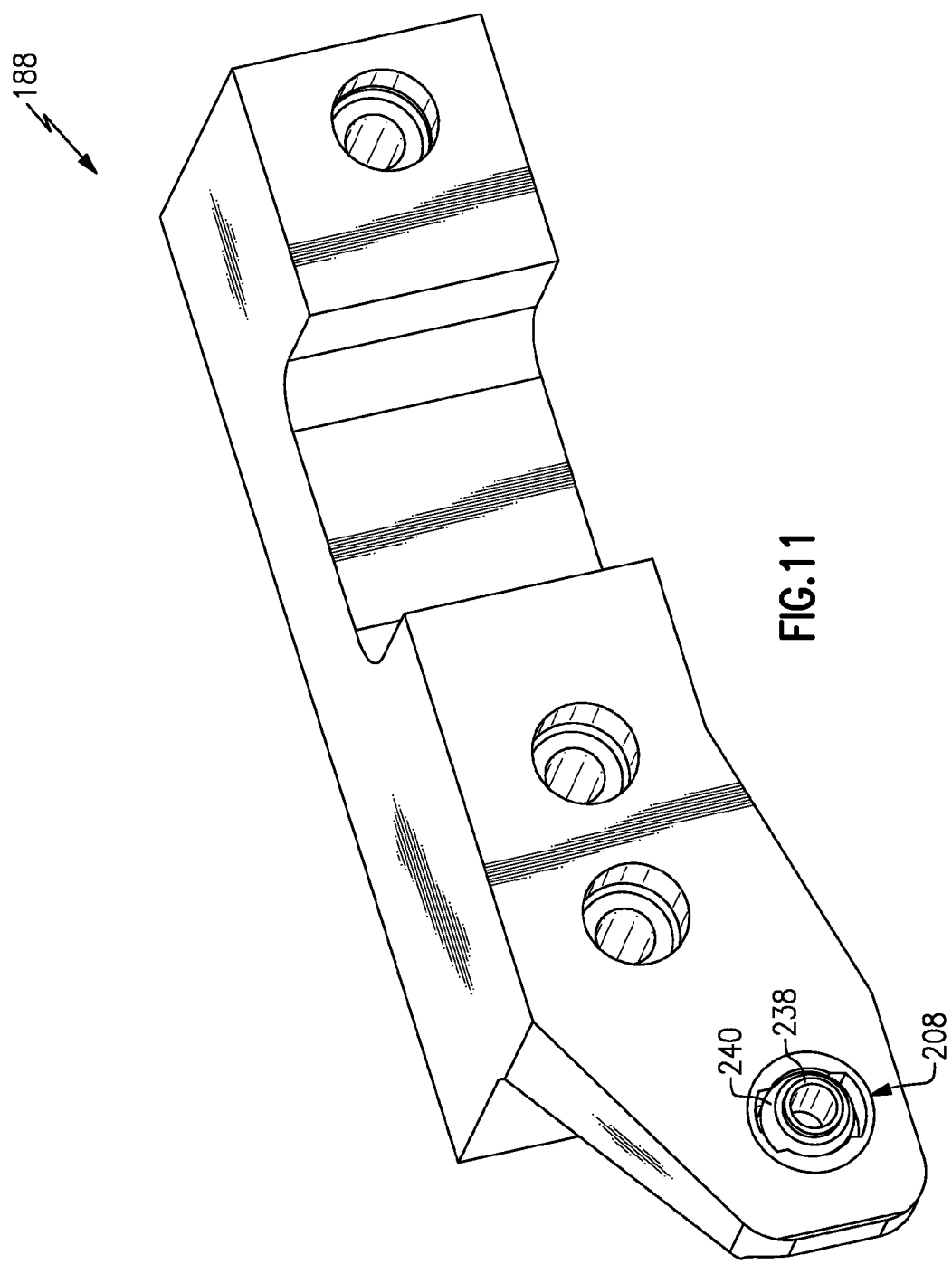
FIG. 11 shows a perspective view of a shear bracket that interfaces with the support pin of FIG. 8.
Figure 12:
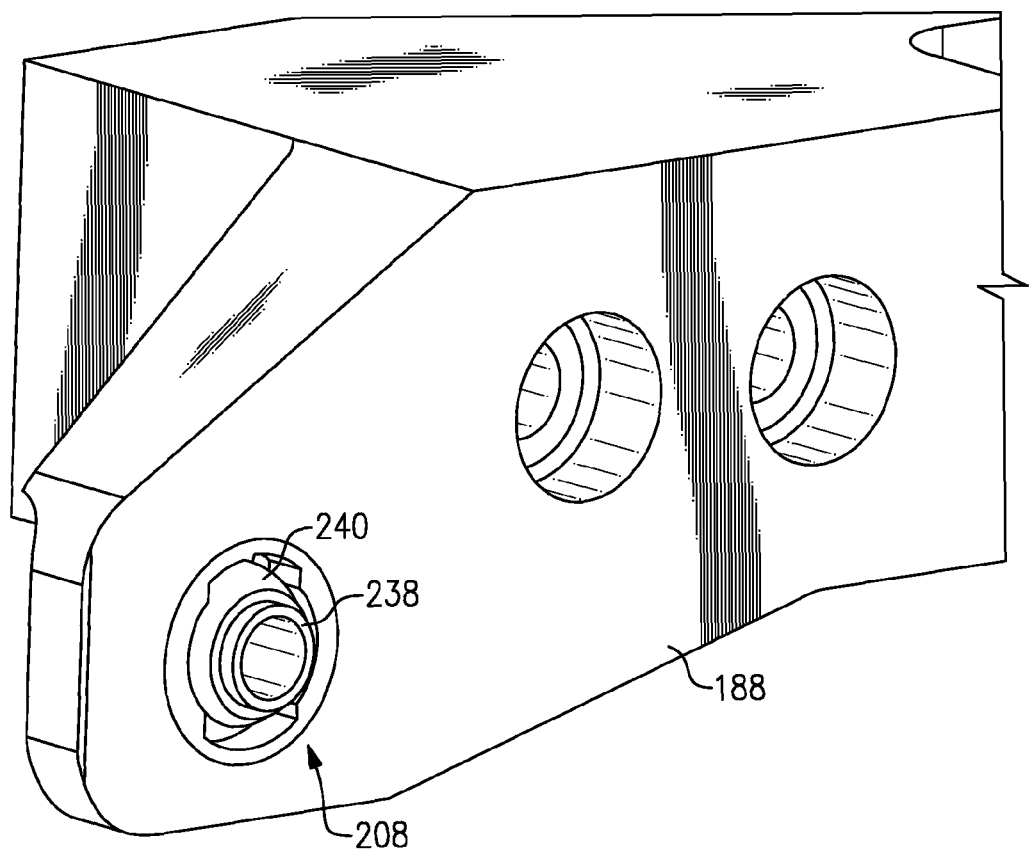
FIG. 12 shows a close-up view of a spherical bearing held by the shear bracket.

Referring to FIG. 7, a highly schematic view of selected portions of the accessory gearbox 160 is shown and diagramed to show selected forces and loads acting on the accessory gearbox 160. Reaction loads are designated as $L_R$, applied loads are designated as $L_A$, and internal loads due to torque are designated as T. Mounting locations M designate mounting connections between the accessory gearbox 160 and the case 140.

Notably, the plate 181 provides a relatively broad interface to react against a force couple using only shear and without a substantial bending load on the gearbox housing portion 180.

The example shear bracket 188 can transfer loading from the starter housing portion 176 to the shaft housing portion 178 and can create a force couple torque reaction into the gearbox housing portion 180.

In some examples, the disclosed configuration for the accessory gearbox 160 has been shown to reduce stresses on the gearbox housing portion 180 by a factor of five over other accessory gearbox designs, such as those that lack a plate 181, a shear bracket 188, or both.

Referring now to FIGS. 8 to 12 with continuing reference to FIG. 4, the example support pin 186 extends along a longitudinal axis $A_{sp}$. The support pin 186 extends through apertures 200 in the flanges 190, an aperture 204 in the hanger 182, and an aperture 208 within the shear bracket 188.

An end portion 210 of the support pin 186 is threaded to receive a nut 214. The end portion 210 further provides an area 216 to engage a washer 218.

Bushings 220 are press fit within the apertures 200 of the flanges 190. The support pin 186 interface with the bushings 220 when received within the apertures 200 of the flanges 190.

An end portion 234 of the support pin 186 is opposite the end portion 210. The end portion 234 includes a hexagonal flange 236 extending radially from the axis $A_{sp}$ past other portions of the support pin 186.

A bushing 238 is press-fit within a spherical bearing 240 that is positioned within the aperture 208 of the shear bracket 188. The end portion 234 interfaces with the bushing 238 when received within the aperture 208 of the shear bracket 188.

The spherical bearing 240 permits movement of the support pin 186 relative to the shear bracket 188 in directions normal to the axis $A_{sp}$. Radial movements may be required to accommodate flexing of the shear bracket 188 relative to the support pin 186 during operation. The flexing may be due to thermal growth of the starter housing portion 176 relative to the shaft housing portion 178.

The end portion 234 is slidable relative to the bushing 238 in directions aligned with the axis $A_{sp}$. The support pin 186 is also slidable axially relative to the bushings 220. As can be appreciated, the washer 218 can contact a flange of one of the bushings 220 to limit axial movements of the support pin 186 relative to the bushings 220 and 238.

The support pin 186 is circumferentially movable relative to the bushings 220 and the bushing 238.

During assembly, the flange 236 may be engaged by a tool to hold the circumferential position of the support pin 186 as the nut 214 is secured to the end portion 210. The aperture 204 within the hanger 182 is oversized relative to a diameter of the support pin 186 such that the support pin 186 is free to rotate and move axially relative to the hanger 182.

Features of the disclosed examples include a support pin used to support different portions of an accessory gearbox while permitting thermal growth differences between the different portions. Stresses within the attachment locations of the accessory gearbox are thus lessened while maintaining positional control of a hanger used to secure the accessory gearbox to an outer case of a turbomachine. The attachment strategy provides the gearbox with six degrees of freedom movement relative to the turbomachine.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

Although embodiments of this invention have been disclosed, a worker of ordinary skill in the art would recognize that certain modifications would come within the scope of this invention. For that reason, the following claims should be studied to determine the true scope and content of this invention.

We claim:

1. A gearbox assembly, comprising:
   a shear bracket connectable to a flange of a housing structure; and
   a support pin extending along a longitudinal axis, the support pin supporting the shear bracket relative to a turbomachine, the support pin moveable axially relative to the shear bracket and the flange of the housing structure, wherein the flange is a flange of a starter.

2. The gearbox assembly of claim 1, further comprising a hanger attachable to the turbomachine to support the support pin.

3. The gearbox assembly of claim 1, wherein the flange is a first flange, and further comprising at least one second flange extending from a shaft housing portion of the housing structure, the support pin supporting the at least one second flange.

4. The gearbox assembly of claim 3, wherein the support pin is received within an aperture of the first flange and an aperture of the at least one second flange.

5. The gearbox assembly of claim 4, wherein the shear bracket is bolted directly to the flange.

6. The gearbox assembly of claim 1, further comprising a spherical bearing that receives the support pin, the spherical bearing held within an aperture of the shear bracket.

7. The gearbox assembly of claim 6, further comprising a bushing held by the spherical bearing, the bushing interfacing directly with the support pin and rotatable about the longitudinal axis relative to the support pin.

8. The gearbox assembly of claim 1, including a gear train housed within the housing structure and wherein the starter is a hydraulic starter and is secured to the housing structure.

9. The gearbox assembly of claim 1, wherein the shear bracket is directly connected to the flange, the support pin is spaced radially from the flange such that the support pin is outside an outermost perimeter of the flange when the shear bracket is directly connected to the flange.

10. A turbomachine assembly, comprising:
    a turbomachine engine;
    a housing structure;
    a gear train within a gearbox housing portion of the housing structure that is selectively driven by the turbomachine;
    a starter within a starter housing portion of the housing structure that selectively drives the turbomachine;
    a shear bracket connectable to a flange of the housing structure; and
    a support pin extending along a longitudinal axis, the support pin supporting the shear bracket relative to the turbomachine engine, the support pin and the shear bracket moveable axially relative to each other, the support pin and the flange movable axially relative to each other, the flange and the shear bracket configured to move together, wherein the support pin is spaced radially from the flange such that the support pin is outside an outermost perimeter of the flange.

11. The turbomachine assembly of claim 10, further comprising a hanger attached to the turbomachine engine and supporting the support pin.

12. The turbomachine assembly of claim 10, wherein the flange is a first flange and is adjacent the starter, and further comprising at least one second flange extending from a shaft housing portion of the housing structure, the support pin supporting the at least one second flange.

13. The turbomachine assembly of claim 10, further comprising a spherical bearing and a bushing, the spherical bearing held within an aperture of the shear bracket, the bushing held by the spherical bearing, the bushing interfacing directly with the support pin and rotatable about the longitudinal axis relative to the support pin.

14. The turbomachine assembly of claim 10, wherein the turbomachine is a land-based turbomachine.

15. A method of supporting a gearbox assembly, comprising:

securing a shear bracket to a portion of a housing structure; and supporting the shear bracket relative to a turbomachine through a support pin that is moveable axially relative to the shear bracket and the portion of the housing structure, wherein the portion of the housing structure is a first portion adjacent a starter, the support pin spaced from the first portion such that the support pin is outside a radially outermost perimeter of the first portion, and further comprising supporting a second portion of the housing structure through the support pin, the second portion adjacent a shaft housing portion of the housing structure.

16. The method of claim 15, further comprising holding the support pin with a hanger attached to the turbomachine.

17. The method of claim 15, wherein the turbomachine is a land-based turbomachine.

\* \* \* \* \*